UNITED STATES PATENT OFFICE.

JONAS W. AYLSWORTH, OF EAST ORANGE, AND FRANK L. DYER, OF MONTCLAIR, NEW JERSEY.

POROUS ARTIFICIAL STONE AND ITS PRODUCTION.

1,087,098. Specification of Letters Patent. Patented Feb. 17, 1914.

No Drawing. Application filed June 14, 1906. Serial No. 321,751.

*To all whom it may concern:*

Be it known that we, JONAS W. AYLSWORTH, a citizen of the United States, residing at 223 Midland avenue, East Orange, county of Essex, and State of New Jersey, and FRANK L. DYER, a citizen of the United States, residing at Montclair, county of Essex, and State of New Jersey, have invented certain new and useful Improvements in Porous Artificial Stone and its Production, of which the following is a description.

Our invention relates to a new manufacture, namely, porous artificial stone, made of Portland cement, plaster-of-Paris, or other hydraulic cement, adapted particularly for the filling in of partitions in steel buildings and for general fireproofing purposes and also to the process of making the stone.

In the construction of modern steel buildings, where the partitions or floors are composed of Portland cement, a mixture of Portland cement and sand is used, which makes a very solid and heavy construction. Great strength for these purposes is not essential. For this purpose, a mixture of plaster-of-Paris and wood pulp is also sometimes used, but such a composition is not thoroughly fire-proof and it requires to be mixed in very small portions, and is moreover comparatively expensive.

According to our invention, we provide an artificial stone, which is especially useful as a filling material for fireproof buildings and which is composed essentially of Portland cement, plaster-of-Paris, or other hydraulic cement, in an aerated or highly porous condition, so that we are enabled to obtain as great a bulk with cement alone as if three times its volume of sand, wood-pulp, or other inert material were added thereto, as is now the practice. The resulting product is a hard light stone, somewhat resembling pumice stone, capable of being sawed into slabs and of being nailed in place, if required. Ordinarily, however, the material will be cast or molded in position, as is done with mixtures of Portland cement and sand or plaster-of-Paris and wood-pulp, at the present time.

Our improved artificial stone is not only a poorer conductor of heat than a mixture of Portland cement and sand, but is also very much cheaper than compositions employing an inert material, since we do away with sand or other inert material entirely and the cost of aerating the cement is very small. Furthermore, the composition is very much lighter than the solid compositions, now used, and hence may be employed with a lighter and cheaper framework, without sacrificing strength in the finished structure.

In carrying our invention into effect we add to Portland or other hydraulic cement, a substance capable of giving off or generating gas in the presence of water and the alkaline constituents of the cement, such as powdered metallic aluminum, powdered metallic calcium, powdered metallic barium or carbid of calcium or barium, or instead, we may make use of two metals, which in the presence of an alkali will result in local action taking place, so as to generate gas; as for example, an alloy of zinc and copper or an alloy of zinc and iron, or zinc granules coated with copper. We prefer, however, to employ powdered metallic aluminum for the purpose, owing to its cheapness and to the fact that while it results in the generation of large quantities of hydrogen gas, the gas does not evolve for a few minutes until the aluminum has commenced to heat slightly, and then it begins to evolve at a high rate. This gives ample opportunity to cast or mold the cement, yet the generation of gas takes place before the cement commences to set. In adding aluminum in small quantities to the cement, the aluminum will be entirely consumed, forming calcium aluminate with the excess of lime contained in or added to the cement. In the case of Portland cement, a small proportion of free lime in slaked condition is preferably added to the cement for combination with the aluminum, because otherwise the resulting cement will be slightly deficient in lime. In the case of plaster-of-Paris, a small percentage of slaked lime is added to effect the reaction. The amount of metallic aluminum used is very small and may conveniently vary between one-quarter of one per cent. and one-half of one per cent. by weight of the cement used. Preferably, from one to two per cent. of free slaked lime is added for the purpose above explained. The lime and aluminum may be added in the dry state to the cement and such a mixture may be made as an article of manufacture at the cement mill, or the aluminum and lime or the aluminum alone may be added to the cement at the time of using. If the aluminum is added in the dry state, it will be preserved indefinitely without any action thereon taking place until water is added. By thus adding to the cement a material or combination of materials that result in the generation of gas, the cement while in a wet condition will be aerated or puffed up, exactly as bread is acted upon by yeast, and will stay in this porous condition while being molded and during and after setting, its bulk increasing according to the amount of gas generated. By adding about one-quarter of one per cent. of metallic aluminum the bulk of the cement may be increased to about four times its normal bulk, giving a product having substantially the same bulk as if three parts of sand or wood-pulp were used with one part of cement or plaster-of-Paris.

The product is hard, although of course, not so hard as a mixture of cement and sand, or of plaster-of-Paris and wood-pulp, it is extremely fireproof, owing to its minute pores, it is sufficiently coherent for all practical purposes, and it is very light. It constitutes a very perfect material for fireproofing or filling in of partitions and may be used for other purposes and in many other arts. For instance, as a material for use instead of plaster in ordinary buildings, a mixture of lime and plaster-of-Paris may be made porous as explained, and molded into slabs and secured in place, or molded into position upon the lathing or other support.

Having now described our invention what we claim as new and desire to secure by Letters Patent is as follows:—

1. The process of making porous artificial stone, which consists in adding to hydraulic cement a metallic material which will rapidly generate a gas when slightly heated in the presence of water and the alkaline constituents of the cement, and adding water thereto, thereby generating a gas *in situ* therein prior to the setting thereof so as to produce pores which exist therein during and after the setting, whereby stone of increased volume is produced, substantially as set forth.

2. The process of making porous artificial stone, which consists in adding to Portland cement a small amount of slaked lime and a material which will rapidly generate a gas when slightly heated in the presence of water and the alkaline constituents of the cement, and adding water thereto, thereby generating a gas *in situ* therein prior to the setting thereof so as to produce pores which exist therein during and after the setting, whereby stone of increased volume is produced, substantially as set forth.

3. The process of making artificial stone, which consists in adding to a quick-setting cement a material which will combine with free lime in the cement, in the presence of water, and result in the generation of gas, in adding water to the cement, whereby gas will be generated therein so as to increase the bulk thereof, in molding the wet mass during the evolution of gas, and in allowing the cement to set in a porous state, substantially as set forth.

4. The process of making artificial stone, which consists in adding to Portland cement slaked lime and a material which will combine with the lime and result in the generation of gas in the presence of water, in adding water to the Portland cement, whereby gas will be generated therein so as to increase the bulk thereof, in molding the wet mass during the evolution of gas, and in allowing the cement to set in a porous state, substantially as set forth.

5. The process of making artificial stone, which consists in adding powdered aluminum to a quick-setting cement in dry condition and having an alkaline constituent therein, whereby upon the addition of water to the cement, hydrogen gas will be evolved to increase the bulk of the cement by the production of pores therein, substantially as set forth.

6. The process of making artificial stone, which consists in adding powdered aluminum to dry Portland cement having an alkaline constituent therein, whereby upon the addition of water to the cement, hydrogen gas will be evolved to increase the bulk of the cement by the production of pores therein, substantially as set forth.

7. The process of making artificial stone, which consists in adding powdered aluminum and slaked lime to a quick-setting cement, and in finally adding water to the mixture, whereby hydrogen gas will be evolved to result in the production of pores within the mass, which exist during and after setting, substantially as set forth.

8. The process of making artificial stone, which consists in adding powdered aluminum and slaked lime to Portland cement, and in finally adding water to the mixture, whereby hydrogen gas will be evolved to result in the production of pores within the mass, which exist during and after setting, substantially as set forth.

9. A new composition consisting of hydraulic cement in dry condition and a metallic material in dry powdered form mixed therewith, which material combines with alkaline constituents of the cement, upon the addition of water thereto, with the resulting generation of considerable quantities of gas, substantially as described.

10. A new composition consisting of Portland cement in dry condition and containing an excess of slaked lime, and a metallic material in powdered form, which material combines with free lime in the cement upon the addition of water thereto, with the resulting generation of considerable quantities of gas, substantially as described.

11. A new composition consisting of Portland cement and substances which react with alkaline ingredients thereof, upon the addition of water thereto, with the resulting generation of considerable quantities of gas, and the consequent increase in the volume of the cement after setting, to several times its normal volume, substantially as described.

12. A new composition, consisting of a quick-setting cement in dry condition and having an alkaline constituent therein, and powdered aluminum mixed therewith in dry powdered form, substantially as set forth.

13. A new composition, consisting of Portland cement having an alkaline constituent therein, and powdered aluminum, substantially as set forth.

14. A new composition, consisting of a quick-setting cement, powdered aluminum, and slaked lime, substantially as set forth.

15. A new composition, consisting of Portland cement, powdered aluminum and slaked lime, substantially as set forth.

16. A new composition, consisting of a quick-setting cement in dry condition and having an alkaline constituent therein and less than 1% of dry powdered aluminum mixed therewith, substantially as set forth.

17. A new composition, consisting of Portland cement in dry condition and having an alkaline constituent therein and less than 1% of dry powdered aluminum mixed therewith, substantially as set forth.

18. The process of making artificial stone, which consists in adding powdered aluminum to a quick-setting cement having an alkaline constituent therein, in adding water to the mixture, whereby gas will be generated therein so as to increase the bulk thereof, in molding the wet mass during the evolution of gas, and in allowing the cement to set in a porous state, substantially as set forth.

This specification signed and witnessed this 13th day of June, 1906.

JONAS W. AYLSWORTH.
FRANK L. DYER.

Witnesses:
ANNA R. KLEHM,
FRANK D. LEWIS.